United States Patent
Owens et al.

(10) Patent No.: US 8,060,081 B2
(45) Date of Patent: Nov. 15, 2011

(54) REMOTE BATTERY REPLACEMENT NOTIFICATION SYSTEM AND METHOD

(75) Inventors: Michael Kevin Owens, Cary, IL (US); Scott Christopher Goering, Naperville, IL (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 267 days.

(21) Appl. No.: 12/255,298

(22) Filed: Oct. 21, 2008

(65) Prior Publication Data

US 2009/0041228 A1    Feb. 12, 2009

Related U.S. Application Data

(63) Continuation of application No. 10/844,222, filed on May 12, 2004, now Pat. No. 7,457,647, which is a continuation of application No. 09/550,991, filed on Apr. 17, 2000, now Pat. No. 6,775,562.

(51) Int. Cl.
*H04W 24/00* (2009.01)

(52) U.S. Cl. .......................... 455/425; 455/574; 702/63

(58) Field of Classification Search ............... 455/550.1, 455/572, 573, 574, 554.1–554.2, 557, 456.6, 455/407, 423, 425; 379/322; 340/7.32–7.33, 340/636.1, 693.2; 702/60–63
See application file for complete search history.

(56) References Cited

U.S. PATENT DOCUMENTS

| | | |
|---|---|---|
| 4,609,864 A | 9/1986 | Pommer, II |
| 5,016,269 A | 5/1991 | Rogers |
| 5,133,081 A | 7/1992 | Mayo |
| RE34,496 E | 1/1994 | Franklin et al. |
| 5,469,494 A | 11/1995 | Ortiz Perez et al. |
| 5,546,072 A * | 8/1996 | Creuseremee et al. ....... 340/574 |
| 5,568,654 A | 10/1996 | Fukawa |
| 5,774,791 A | 6/1998 | Strohallen et al. |
| 5,859,894 A | 1/1999 | Ortiz Perez et al. |
| 5,889,465 A | 3/1999 | Mercadante et al. |
| 5,901,361 A | 5/1999 | Luong |
| 5,966,428 A | 10/1999 | Ortiz Perez et al. |
| 6,028,916 A | 2/2000 | Beveridge |
| 6,072,984 A | 6/2000 | Barringer |
| 6,150,928 A | 11/2000 | Murray |
| 6,236,326 B1 | 5/2001 | Murphy |

(Continued)

FOREIGN PATENT DOCUMENTS

WO      9948070     9/1999

OTHER PUBLICATIONS

Notice of Allowance issued by the United States Patent and Trademark Office in connection with U.S. Appl. No. 10/844,222 on Sep. 5, 2008 (6 pages).

(Continued)

*Primary Examiner* — Christian Hannon
(74) *Attorney, Agent, or Firm* — Hanley, Flight & Zimmerman, LLC.

(57) ABSTRACT

A remote battery replacement notification system (10) for a communication system includes a subscriber unit (12) having a battery (14). An operational support system (16) is in communication with the subscriber unit (12). The operational support system (16) periodically polls the subscriber unit (12). A compact service node (18) is in communication with the subscriber unit (12). The compact service node (18) sends a replace battery notification to the subscriber unit (12) when a replace battery message is received from the operational support system (16).

15 Claims, 7 Drawing Sheets

U.S. PATENT DOCUMENTS

| | | | |
|---|---|---|---|
| 6,321,208 | B1 | 11/2001 | Barnett et al. |
| 6,393,105 | B1 | 5/2002 | Beveridge |
| 6,459,440 | B1 * | 10/2002 | Monnes et al. ............... 715/808 |
| 6,459,896 | B1 * | 10/2002 | Liebenow .................... 455/425 |
| 6,480,727 | B1 | 11/2002 | Gerdisch |
| 6,545,448 | B1 | 4/2003 | Stanley et al. |
| 6,624,635 | B1 | 9/2003 | Lui |
| 6,650,750 | B1 | 11/2003 | Bortolini |
| 6,658,576 | B1 * | 12/2003 | Lee ............................... 713/320 |
| 6,775,562 | B1 | 8/2004 | Owens et al. |
| 7,457,647 | B2 | 11/2008 | Owens et al. |
| 2004/0207404 | A1 | 10/2004 | Zhang et al. |
| 2004/0213286 | A1 | 10/2004 | Jette et al. |
| 2006/0034449 | A1 | 2/2006 | Joerger |
| 2006/0053309 | A1 | 3/2006 | Vereen et al. |

OTHER PUBLICATIONS

Office action issued by the United States Patent and Trademark Office in connection with U.S. Appl. No. 10/844,222 on Jun. 13, 2008 (8 pages).

Office action issued by the United States Patent and Trademark Office in connection with U.S. Appl. No. 10/844,222 on Oct. 3, 2007 (10 pages).

Office action issued by the United States Patent and Trademark Office in connection with U.S. Appl. No. 10/844,222 on Jun. 1, 2007 (11 pages).

Office action issued by the United States Patent and Trademark Office in connection with U.S. Appl. No. 10/844,222 on Aug. 28, 2006 (12 pages).

Office action issued by the United States Patent and Trademark Office in connection with U.S. Appl. No. 09/550,991 on Dec. 4, 2002 (11 pages).

Office action issued by the United States Patent and Trademark Office in connection with U.S. Appl. No. 09/550,991 on Feb. 26, 2003 (9 pages).

Office action issued by the United States Patent and Trademark Office in connection with U.S. Appl. No. 09/550,991 on Jun. 4, 2003 (9 pages).

Office action issued by the United States Patent and Trademark Office in connection with U.S. Appl. No. 09/550,991 on Aug. 21, 2003 (8 pages).

Office action issued by the United States Patent and Trademark Office in connection with U.S. Appl. No. 09/550,991 on Jan. 2, 2004 (10 pages).

Notice of Allowance issued by the United States Patent and Trademark Office in connection with U.S. Appl. No. 09/550,991 on Apr. 20, 2004 (5 pages).

* cited by examiner

REMOTE BATTERY REPLACEMENT NOTIFICATION SYSTEM AND METHOD

RELATED APPLICATIONS

The present patent is a continuation of U.S. application Ser. No. 10/844,222, filed May 12, 2004, which is a continuation of U.S. application Ser. No. 09/550,991, filed Apr. 17, 2000, now U.S. Pat. No. 6,775,562, which are hereby incorporated herein by reference in their entireties.

FIELD OF THE INVENTION

The present invention relates to communication systems and more particularly to a remote battery replacement notification system and method.

BACKGROUND OF THE INVENTION

In the future telecommunication services that have traditionally been delivered by cable will be delivered by fiber optics or wireless channels. Fiber optics and wireless channels are not designed to carry power as Plain Old Telephone Service (POTS) does presently. As a result, subscriber units at a customer's location may be locally powered with battery back-up. The battery back-up will maintain continuous service of the telecommunication services during a commercial power failure. The batteries have a long but finite lifetime and the customer may not remember to check their batteries. Failure to replace the batteries will result in the customer losing their telecommunication services during power outage.

Thus there exist a need for a battery replacement notification system and method.

DETAILED DESCRIPTION OF THE DRAWINGS

A remote battery replacement notification system for a communication system includes a subscriber unit having a battery. An operational support system is in communication with the subscriber unit. The operational support system periodically polls the subscriber unit. A compact service node is in communication with the subscriber unit. The compact service node sends a replace battery notification to the subscriber unit when a replace battery message is received from the operational support system.

Figure 1:
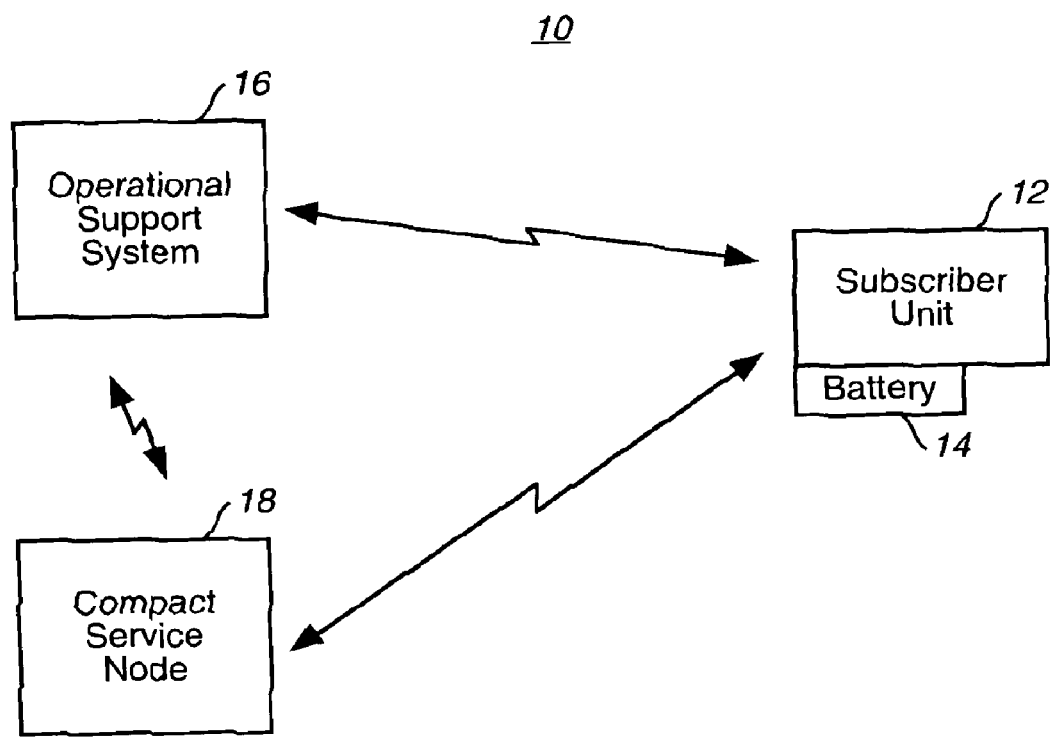
FIG. 1 is a block diagram of a remote battery replacement notification system in accordance with one embodiment of the invention.

FIG. 1 is a block diagram of a remote battery replacement notification system 10 in accordance with one embodiment of the invention. The system 10 has a subscriber unit 12 having a battery 14. An operational support system 16 is in communication with the subscriber unit 12. The operational support system periodically polls the subscriber unit 12. A compact service node 18 is in communication with the subscriber unit 12. The compact service node 18 sends a replace battery notification to the subscriber unit 12 when a replace battery message is received from the operational support system 16.

Figure 2:
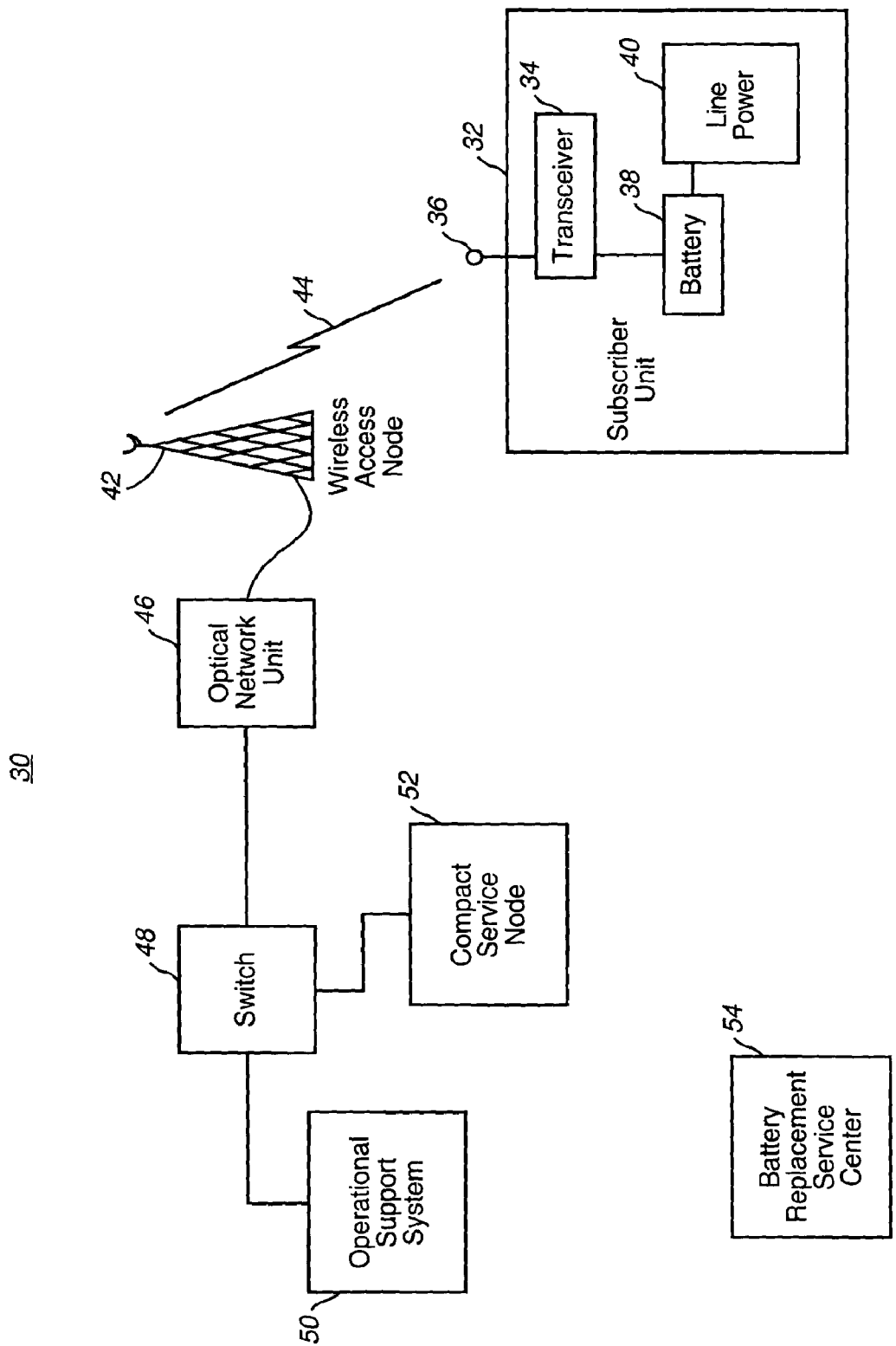
FIG. 2 is a block diagram of a remote battery replacement notification system in accordance with one embodiment of the invention.

FIG. 2 is a block diagram of a remote battery replacement notification system 30 in accordance with one embodiment of the invention. The system 30 has a subscriber unit 32. Commonly the subscriber unit would be attached to the outside of a subscriber's residence. The subscriber unit 32 has a transceiver 34 connected to an antenna 36. A battery 38 is connected to the transceiver 34 and to a line power input 40. The battery 38 is used when there is a commercial power outage. A wireless access node 42 has a wireless connection 44 with the transceiver 34 of the subscriber unit 32. An optical network unit 46 is connected to the wireless access node 42. The optical network unit 46 converts a fiber optic signal to an electrical or RF signal. A switch 48 is connected to the optical network unit 46. The switch 48 may be a circuit switch or a packet switch. An operational support system 50 is connected to the switch 48. The operational support system 50 periodically polls the subscriber unit 32. The general function of the operational support system 50 is to monitor the integrity of the links (phone lines). A compact service node 52 is connected to the switch 48. The compact service node 52 sends a replace battery notification to the subscriber unit 32 when a replace battery message is received from the operational support system 50. A battery replacement service center 54 is connected to the operational support system 50. The battery replacement service center 54 may send out a service person to replace the battery for the subscriber.

Figure 3:
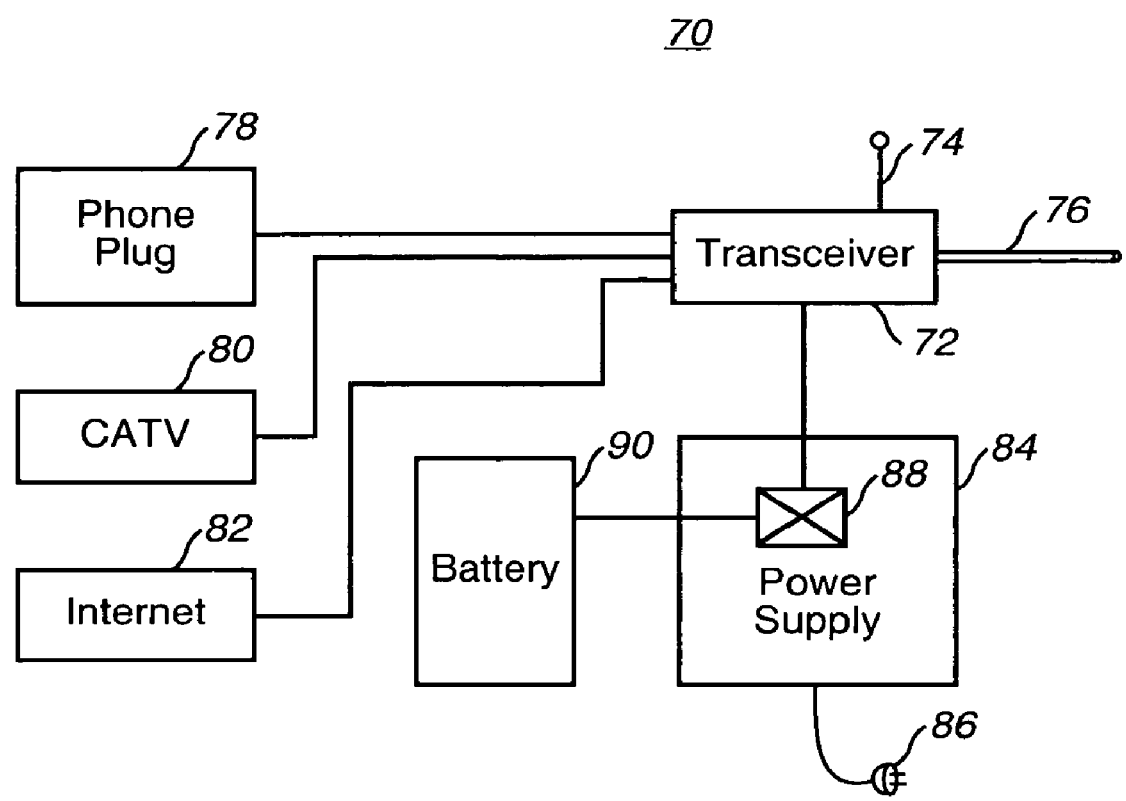
FIG. 3 is a block diagram of a subscriber unit in accordance with one embodiment of the invention.

FIG. 3 is a block diagram of a subscriber unit 70 in accordance with one embodiment of the invention. The subscriber unit 70 has a transceiver 72 connected to an antenna 74. In an alternative embodiment the transceiver 72 is connected to a fiber optic cable 76. A telephone plug (POTS jack) 78 is connected to a transceiver 72. A cable TV (CATV) output 80 is connected to a transceiver 72. An internet output 82 is connected to a transceiver 72. The transceiver 72 is connected to a power supply 84. The power supply 84 conditions the line power 86. A switch 88 switches the transceiver 72 to battery 90 power when a power outage is detected. In one embodiment, the power supply acts a battery charging circuit.

Figure 4:
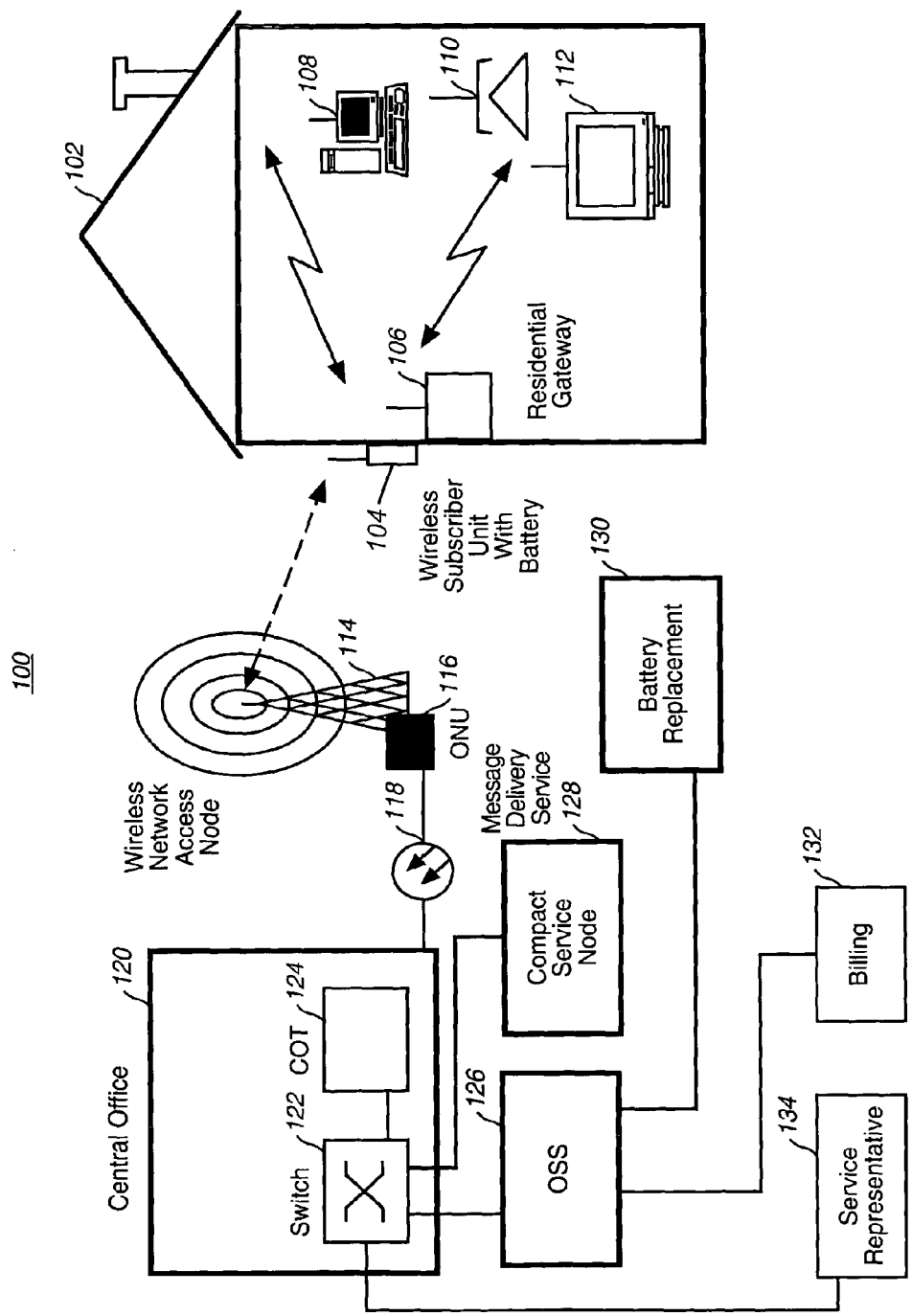
FIG. 4 is a block diagram of a remote battery replacement notification system in accordance with one embodiment of the invention.

FIG. 4 is a block diagram of a remote battery replacement notification system 100 in accordance with one embodiment of the invention. A residence 102 has a subscriber unit 104 with a battery. The subscriber unit 104 is connected to a residential gateway 106. The residential gateway provides an in-house wireless connections to a computer 108, a telephone 110 and a television 112. The subscriber unit is connected to a wireless network access node 114. An Optical Network Unit (ONU) 116 is connected to the wireless network access node 114. A fiber optic cable 118 connects the ONU 116 to a central office 120. The central office 120 has a switch 122 and a central office terminal (COT) 124. The COT 124 is where the telephone lines are terminated and then connected to the switch 122. The COT 124 may include an optical to electrical converter that connects to the fiber optic cable 118. An Operational Support System (OSS) 126 is connected to the switch 122. The OSS 126 periodically polls the subscriber unit 104 for information such as the state of the battery. A compact service node 128 is connected to the switch 122. The compact service node 128 receives a replace battery message from the OSS 126. The compact service node 128 then sends a replace battery notification to the subscriber unit 104. The notification can be a voice notification to the telephone 110 or an email or text message to the computer 108. The notification provides the user with a number of options to replace the battery. One option is to send a person out to replace the battery. In that case a message is sent to a battery replacement organization 130. Another option is for the subscriber to purchase and replace the battery himself In this case a reminder is sent by a billing organization 132. The billing organization 132 may also enclose a discount for the purchase of the battery from selected stores. Another option is for the subscriber to talk with a service representative at service representative organization 134.

Figure 5:
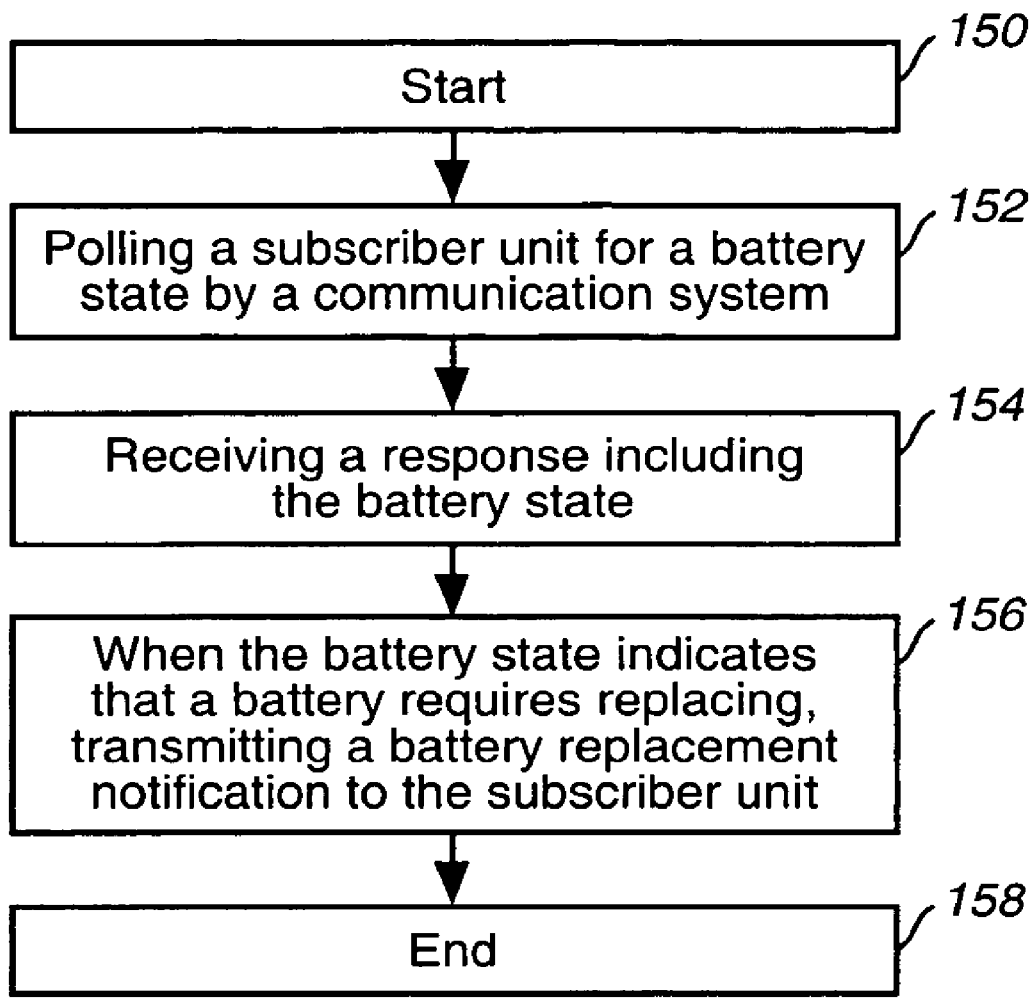
FIG. 5 is a flow chart of the steps used in a remote battery replacement notification method in accordance with one embodiment of the invention.

FIG. 5 is a flow chart of the steps used in a remote battery replacement notification method in accordance with one embodiment of the invention. The process starts, step 150, by polling a subscriber unit for a battery state by a communication system at step 152. A response is received that contains the battery state at step 154. When the battery state indicates that a battery requires replacement at step 156, a battery replacement notification is sent to the subscriber unit which ends the process at step 158. In one embodiment, the communication system receives a reply from the subscriber. When the reply is to purchase a new battery at a designated store, a battery discount is generated for inclusion in a subscriber's bill. The battery discount provides the customer a discounted price for the battery at designated stores. In one embodiment, the system notifies the subscriber of the address of the designated store. When the reply is to send a new battery, an order is transmitted to a battery supplier. When the reply is to install a new battery, the order is transmitted to a battery installation service organization. When the reply is to speak with a service representative, a phone connection is established with a service representative.

In one embodiment, a replace battery message is sent to a compact service node. Next it is determined when a subscriber has finished dialing a called number. When the subscriber has finished dialing a called number, the subscriber is provided with a plurality of battery replacement options. A response is received from the subscriber. A report reminding the customer to change the battery is sent to the billing system.

In one embodiment, the system determines a subscriber email address. A replace battery message is sent to the subscriber email address. In one embodiment, the replace battery message includes a plurality of hypertext link corresponding to a plurality of battery replacement options.

Figure 6:
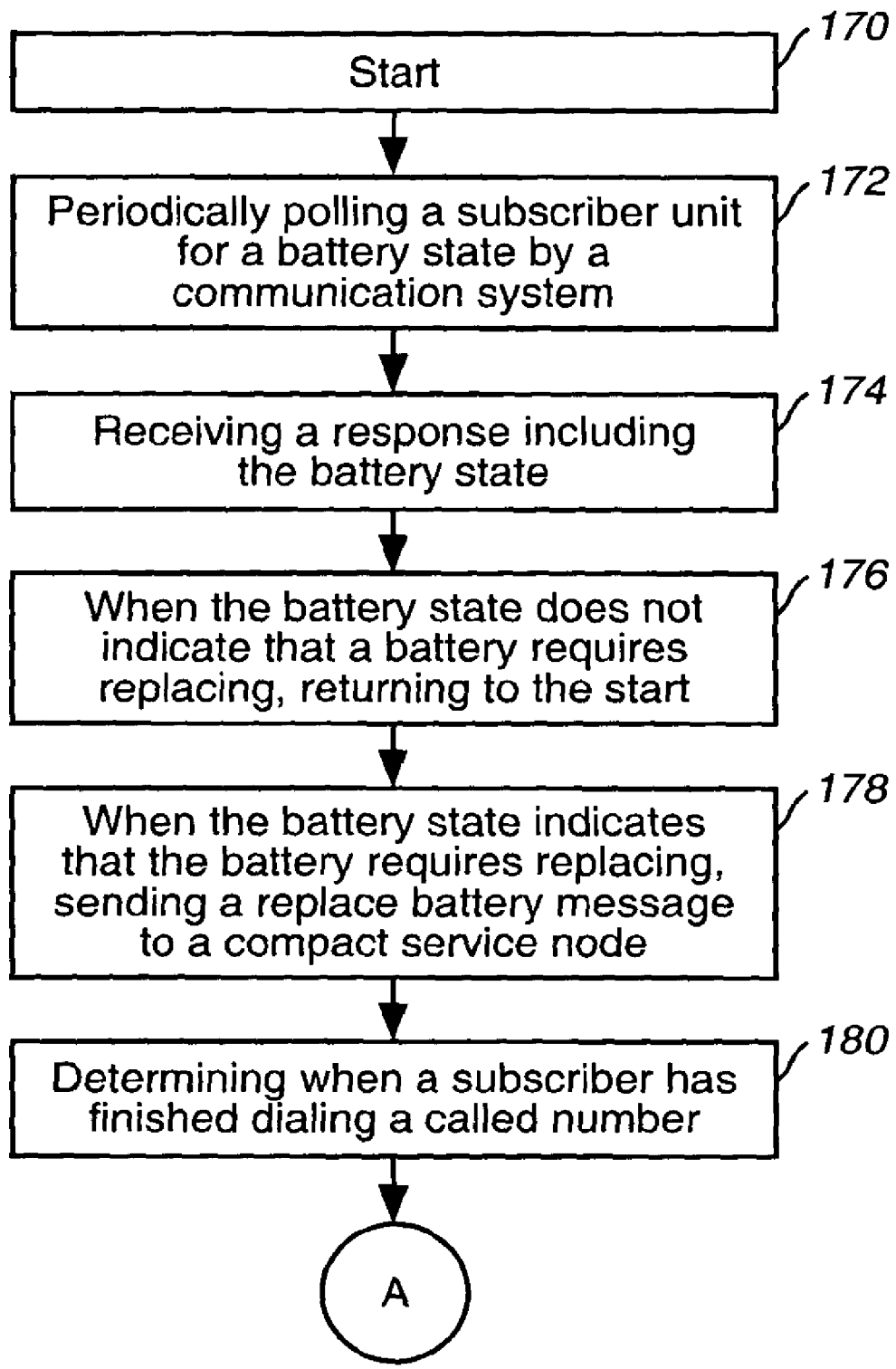
FIGS. 6 & 7 are a flow chart of the steps used in a remote battery replacement notification method in accordance with one embodiment of the invention.
Figure 7:
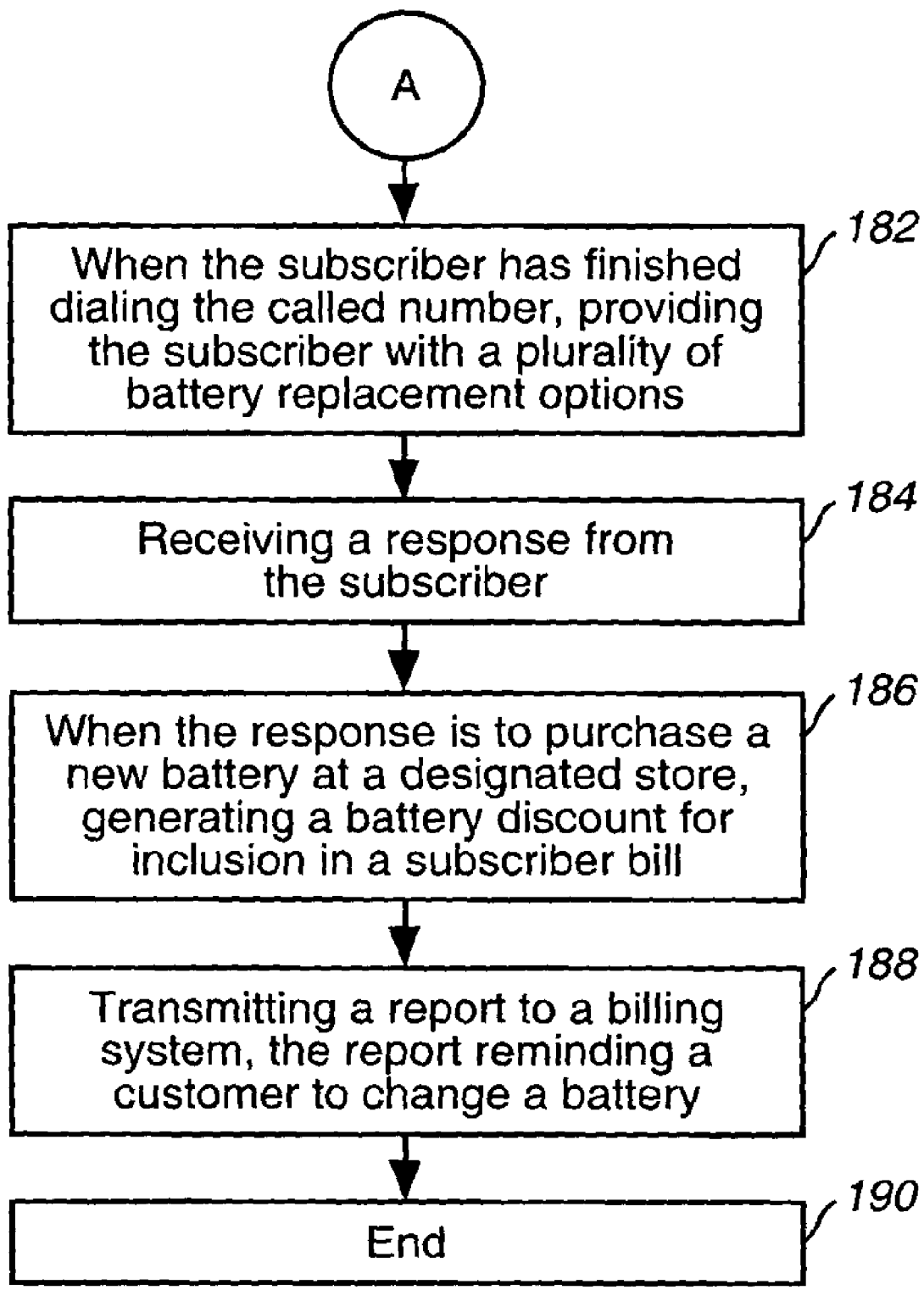

FIGS. 6 & 7 are a flow chart of the steps used in a remote battery replacement notification method in accordance with one embodiment of the invention. The process starts, step 170, by periodically polling a subscriber unit for a battery state by a communication system at step 172. A response including a battery state is received at step 174. When the battery state does not indicate that a battery requires replacing at step 176, the process starts over. When the battery state indicates that the battery requires replacing, a replace battery message is sent to a compact service node at step 178. At step 180 it is determined when a subscriber has finished dialing a called number. When the subscriber has finished dialing the called number, the subscriber is provided with a plurality of battery replacement options at step 182. A response is received from the subscriber at step 184. When the response is to purchase a new battery at a designated store, a battery discount is generated for inclusion in a subscriber bill at step 186. In one embodiment the battery discount is a coupon. At step 188 a report is transmitted to a billing system to remind the customer to change a battery which ends the process at step 190.

Thus there has been described a system and method for remote battery replacement notification that automatically warns a customer to replace a battery. A follow up reminder in the subscriber's bill should make it rare that subscriber will lose their telecommunication services during a power outage.

The methods described herein can be implemented as computer-readable instructions stored on a computer-readable storage medium that when executed by a computer will perform the methods described herein.

While the invention has been described in conjunction with specific embodiments thereof, it is evident that many alterations, modifications, and variations will be apparent to those skilled in the art in light of the foregoing description. Accordingly, it is intended to embrace all such alterations, modifications, and variations in the appended claims.

What is claimed is:
1. A subscriber unit comprising:
a wireless transceiver to receive telecommunication signals from a wireless access node, the transceiver to provide battery status information to an operational support system via the wireless access node, the transceiver to receive a replace battery notification from a service node in response to a replace battery message received by the service node from the operational support system, the transceiver to provide the replace battery message to a subscriber, the transceiver to establish a phone connection with a service representative in response to a reply from the subscriber to an option presented via the transceiver in the replace battery message.

2. A subscriber unit as defined in claim 1, wherein the subscriber unit is to be polled by the operational support system via the wireless access node.

3. A subscriber unit as defined in claim 1, wherein the transceiver is in communication with the operational support system via an optical network unit.

4. A subscriber unit as defined in claim 1, wherein the transceiver is in communication with at least one of an Internet, a personal computer, and a television.

5. A subscriber unit as defined in claim 1, further comprising a power supply having an input to receive power from a commercial power source and an output to supply power to the transceiver.

6. A subscriber unit as defined in claim 5, further comprising a switch in communication with a battery and the power supply, the switch to cause the transceiver to receive power from the battery when the commercial power source experiences an outage.

7. A subscriber unit comprising:
a wireless transceiver to receive telecommunication signals from a wireless access node, the transceiver to provide battery status information to an operational support system via the wireless access node, the transceiver to receive a replace battery notification from a service node in response to a replace battery message received by the service node from the operational support system, the transceiver to provide the replace battery message to a subscriber, the transceiver to establish a phone connection with a service representative in response to the replace battery message, wherein the replace battery message includes a link corresponding to a battery replacement option, and wherein the link is an element of an email sent to an email address associated with the subscriber.

8. A method of operating a subscriber unit comprising:
  receiving, via a wireless transceiver, telecommunication signals from a wireless access node;
  providing battery status information to an operational support system via the wireless access node;
  receiving a replace battery notification from a compact service node in response to a replace battery message received by the service node from the operational support system;
  forwarding the replace battery message to a subscriber; and
  transmitting a delivery order to a battery supplier in response to a reply to the battery replacement message.

9. A method as defined in claim 8, further comprising receiving a periodic polling from the operational support system.

10. A method as defined in claim 8, wherein the battery replacement message comprises an audio message.

11. A method as defined in claim 8, wherein the battery replacement message comprises a text message.

12. A method comprising:
  receiving, via a wireless transceiver, telecommunication signals from a wireless access node;
  providing battery status information to an operational support system via the wireless access node;
  receiving a replace battery notification from a compact service node in response to a replace battery message received by the service node from the operational support system;
  forwarding the replace battery message to a subscriber; and
  determining when the subscriber has finished dialing a telephone number on a telephone and providing the subscriber a plurality of audible battery replacement options via the telephone, wherein the plurality of battery replacement options includes requesting a service representative to replace the battery.

13. A method comprising:
  receiving, via a wireless transceiver, telecommunication signals from a wireless access node;
  providing battery status information to an operational support system via the wireless access node;
  receiving a replace battery notification from a compact service node in response to a replace battery message received by the service node from the operational support system;
  forwarding the replace battery message to a subscriber; and
  determining when the subscriber has finished dialing a telephone number on a telephone and providing the subscriber a plurality of recorded audible battery replacement options via the telephone, wherein the plurality of battery replacement options includes requesting to speak with a service representative.

14. A method, comprising:
  receiving, via a wireless transceiver, telecommunication signals from a wireless access node;
  providing battery status information to an operational support system via the wireless access node;
  receiving a replace battery notification from a compact service node in response to a replace battery message received by the service node from the operational support system;
  forwarding the replace battery message to a subscriber; and
  determining when the subscriber has finished dialing a telephone number on a telephone and providing the subscriber a plurality of recorded audible battery replacement options via the telephone.

15. A method as defined in claim 14, wherein the plurality of battery replacement options includes purchasing a new battery at a designated store.

* * * * *